(12) United States Patent
Noecker, Jr. et al.

(10) Patent No.: US 9,766,602 B2
(45) Date of Patent: Sep. 19, 2017

(54) MANAGING LOCAL ENVIRONMENT USING DATA TRAFFIC INFORMATION

(75) Inventors: Nicholas J. Noecker, Jr., Houston, TX (US); Julio E. Ruano, Austin, TX (US); Javier R. Torres, Austin, TX (US); Paul S. Williamson, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1364 days.

(21) Appl. No.: 12/538,916

(22) Filed: Aug. 11, 2009

(65) Prior Publication Data

US 2011/0040391 A1    Feb. 17, 2011

(51) Int. Cl.
G06F 15/173 (2006.01)
G05B 15/02 (2006.01)

(52) U.S. Cl.
CPC ...... *G05B 15/02* (2013.01); *G05B 2219/2642* (2013.01)

(58) Field of Classification Search
CPC .............................................. G05B 2219/2642
USPC ...................................................... 709/224
See application file for complete search history.

(56) References Cited

U.S. PATENT DOCUMENTS

| | | | |
|---|---|---|---|
| 6,650,322 B2 | 11/2003 | Dai et al. | |
| 6,993,417 B2 | 1/2006 | Osann, Jr. | |
| 7,017,057 B2 | 3/2006 | Magee et al. | |
| 2001/0052862 A1* | 12/2001 | Roelofs | 340/999 |
| 2003/0050737 A1 | 3/2003 | Osann, Jr. | |
| 2006/0129863 A1* | 6/2006 | Kouropoulos et al. | 713/340 |
| 2007/0245420 A1* | 10/2007 | Yong et al. | 726/23 |
| 2007/0259673 A1* | 11/2007 | Willars et al. | 455/453 |
| 2008/0103686 A1* | 5/2008 | Alberth et al. | 701/200 |
| 2008/0271123 A1* | 10/2008 | Ollis et al. | 726/4 |
| 2010/0100716 A1* | 4/2010 | Scott et al. | 713/1 |
| 2011/0015797 A1* | 1/2011 | Gilstrap | 700/291 |

* cited by examiner

*Primary Examiner* — Kevin Mai
(74) *Attorney, Agent, or Firm* — Garg Law Firm, PLLC; Rakesh Garg; Diana Roberts

(57) ABSTRACT

A system, and computer usable program product for managing a local environment using data traffic information are provided in the illustrative embodiments. According to the invention, an data traffic on a data network associated with the local environment is monitored at a networking device. The local environment includes one or more devices. A device from the one or more devices is controllable using the data network. A condition in the local environment is inferred from the data traffic. An action to cause a change in the local environment is determined. A command corresponding to the action is sent to a subset of devices in the set of devices in the local environment to perform the action.

15 Claims, 6 Drawing Sheets

MANAGING LOCAL ENVIRONMENT USING DATA TRAFFIC INFORMATION

BACKGROUND OF THE INVENTION

1. Field of the Invention

The present invention relates generally to an improved data processing system, and in particular, to a computer implemented method for managing appliances and devices in an environment. Still more particularly, the present invention relates to a system, and computer usable program code for managing a local environment using information about the data traffic in one or more data networks associated with the local environment.

2. Description of the Related Art

A local environment is a locale having a set of devices. A set of devices is one or more devices. A device may be an appliance, such as, for example, an air conditioner, a lighting fixture, or a premises security device. A device may also be a computing device, such as, for example, a computer, a printer, or a data storage device. Some examples of a local environment may be a home, an office space, a storage space, a vehicle, or a retail store.

Devices in local environments consume energy. Presently, the most common form of energy consumed when the devices in local environments are operating is electricity. Operating the devices in a local environment in a way that reduces waste of energy is desirable.

SUMMARY OF THE INVENTION

The illustrative embodiments provide a system, and computer usable program product for managing a local environment using data traffic information. According to the invention, an embodiment monitors at a networking device, data traffic on a data network associated with the local environment. The local environment includes one or more devices. A device from the one or more devices is controllable using the data network. The embodiment infers a condition in the local environment from the data traffic. The embodiment determines an action to cause a change in the local environment. The embodiment sends a command corresponding to the action to a subset of devices in the set of devices in the local environment to perform the action.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
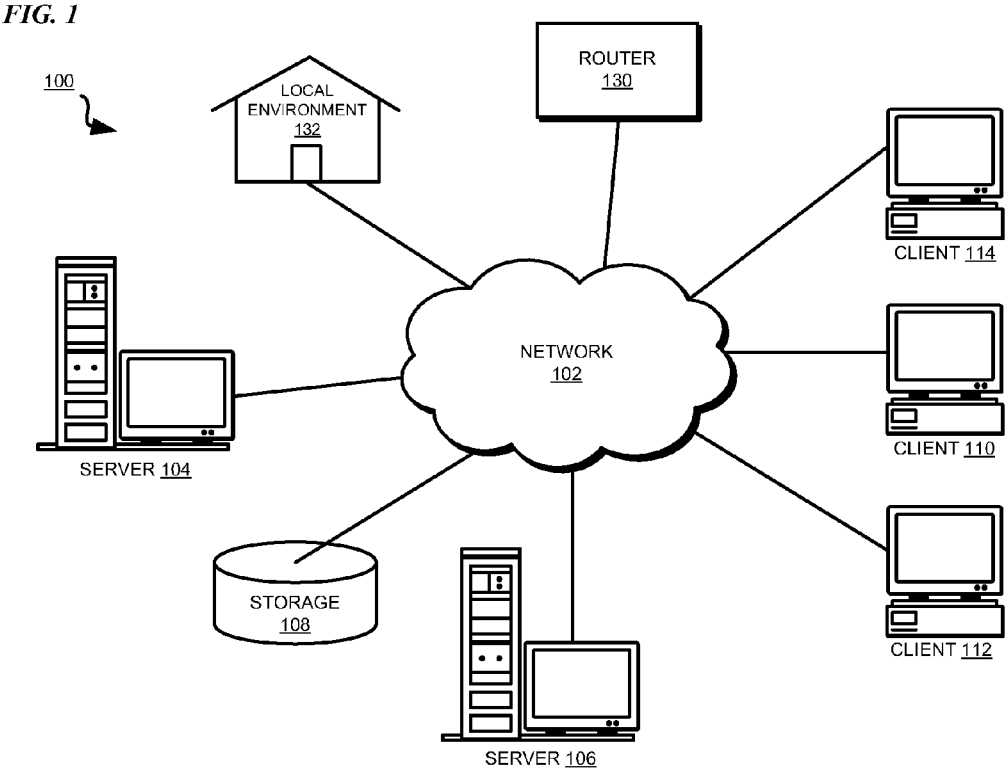
FIG. 1 depicts a pictorial representation of a network of data processing systems in which illustrative embodiments may be implemented.

The invention recognizes that presently available solutions for home automation have certain undesirable limitations and consequences. As one example, a presently available home automation system employs numerous sensors, transducers and other similar devices to monitor the operations of other devices. For example, an existing home automation system may require the use of a motion sensing switching device that can turn off a lighting device when no motion is detected in a defined perimeter.

The invention recognizes as a limitation of presently available systems that such systems cannot achieve their objectives of ease of operation or automation of operation without requiring additional devices. In the example above, a motion sensing device is added to operate a lighting device in a touch-less manner.

The invention further recognizes as a consequence of presently available systems that numerous devices are additionally introduced into a local environment that themselves consume energy. Thus the invention recognizes that presently available automation solutions for local environments require additional devices, which introduce cost, complexity, and energy consumption in the management of the local environment.

To address these and other problems associated with managing local environments, the illustrative embodiments of the invention provide a computer usable program product, and data processing system for managing a local environment using data traffic information. Using the illustrative embodiments, patterns in data communication traffic going into and coming out of a local environment over one or more networks can be used to infer desirable states of certain devices in the local environment.

For example, using the embodiments of the invention, a drop in interactive data traffic from a local environment such as an office, for example, forms submission, website logins, or file saving operations, may be usable to infer that a user may not be present in the local environment. Conversely, a rise in such type of data traffic may be usable to infer that a user has arrived or returned to the office.

As another example, a calendar entry may indicate that several persons are going to be meeting in a designated room, a local environment, at a given time. Such information may be usable in an embodiment of the invention to keep an air conditioning unit shut off until a preset time before the meeting. Furthermore, the calendaring information may be used in conjunction with data traffic associated with the local environment to make similar decisions. Many other example applications of the invention are conceivable from this disclosure.

The examples in this disclosure are used only for the clarity of the description and are not limiting on the illustrative embodiments. Additional operations, actions, tasks, activities, and manipulations will be conceivable from this disclosure and the same are contemplated within the scope of the illustrative embodiments.

For example, in one embodiment within the scope of the invention, a volume of data traffic above a threshold volume of data traffic may indicate presence of a user. Conversely, in such an embodiment, a volume of data traffic at or below the threshold may indicate absence of the user.

In another embodiment within the scope of the invention, a type of data traffic may be designated as being caused by a user. Certain other type of data traffic may be designated as being caused by data processing system activity. These and other similar types of data traffic may be used to determine whether a user may be present or absent in a given local environment.

The illustrative embodiments are described using devices, specific code, data structures, designs, layouts, schematics, and tools only as examples and are not limiting on the illustrative embodiments. For example, some illustrative embodiments may form an inference from a pattern in a given data traffic, but the illustrative embodiments may be implemented to use another measurement or characteristic of data traffic within the scope of the illustrative embodiment. Furthermore, data traffic, information from one or more information sources, previous inferences, configurations, and instructions may be used in any combination for implementing an embodiment of the invention without departing the scope of the invention.

The illustrative embodiments may be implemented with respect to any type of local environment and any type of device within the local environment without limitation. For example, an embodiment of the invention may be implemented using a computing device in an office. Another implementation may be for saving gasoline in a vehicle using the principles of the invention. Another implementation may be for conserving another type of fuel or energy source in a terrestrial, airborne, or extra-atmospheric local environments. Including an embodiment of the invention within a given local environment is contemplated within the scope of the invention.

Furthermore, the illustrative embodiments are described in some instances using particular hardware or software components and data processing environments only as an example for the clarity of the description. The illustrative embodiments may be used in conjunction with other comparable or similarly purposed systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
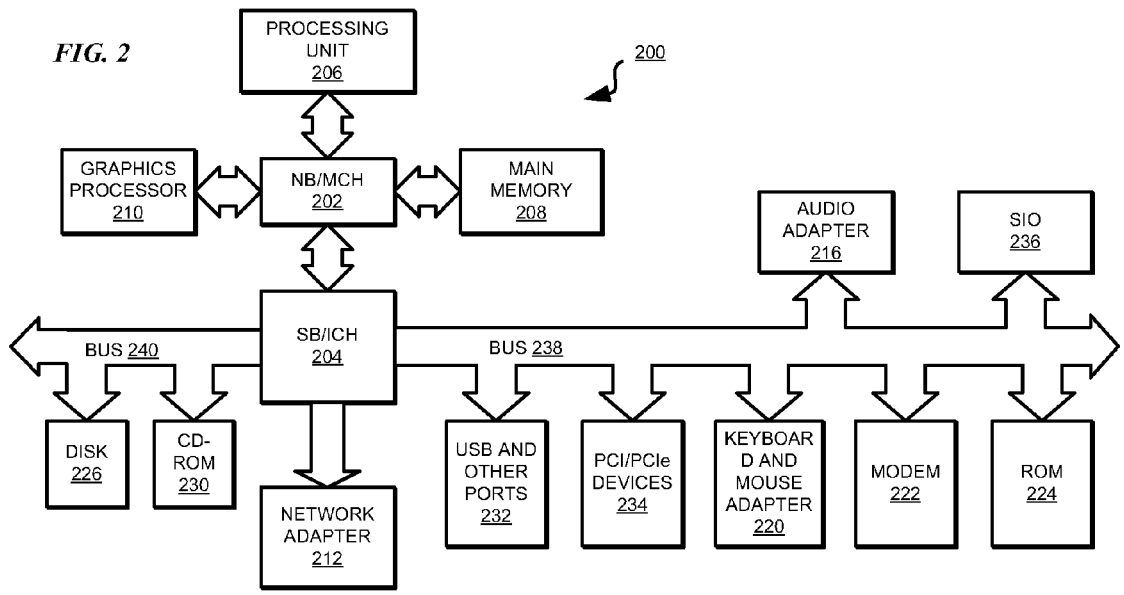
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may have software applications or software tools executing thereon.

Router 130 may facilitate data communication between any data processing systems or components on network 102. A router is a data processing system configured to facilitate data communication between two or more data processing systems or computing devices. For example, a networking device may enable data communication between server 104 and client 114, and generally any two or more data processing systems on network 102. Router 130 is an example of such a networking device. Furthermore, devices in local environment 132 may also communicate with data processing systems or computing devices on network 102 using router 130. For example, a computer in local environment 132 may communicate with server 106 or storage unit 108 using router 130.

Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
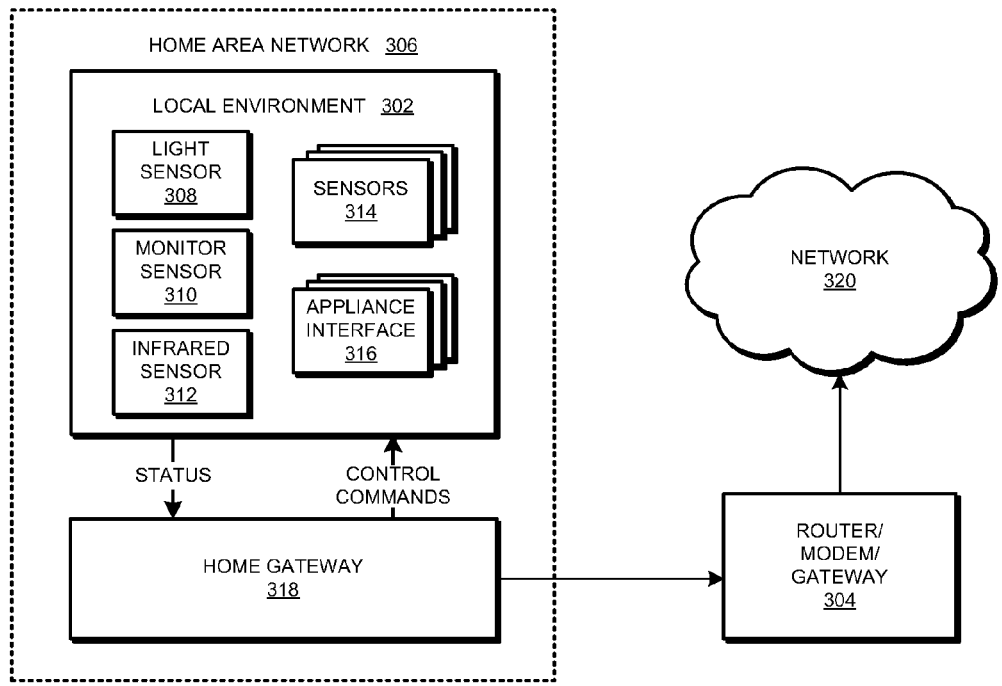
FIG. 3 depicts a block diagram of an example local environment using an example existing automation solution in which an illustrative embodiment may be implemented.

With reference to FIG. 3, this figure depicts a block diagram of an example local environment using an example existing automation solution in which an illustrative embodiment may be implemented. Local environment 302 may be analogous to local environment 132 in FIG. 1.

Router 304 may be a networking device, such as a router, a gateway, a switch, or a modem, and may be implemented, for example, using router 130 in FIG. 1. Furthermore, router 304 may be a networking device that may support one or more wired or wireless data communication protocols.

In one embodiment, router 304 may be a gateway, which is a device at a network node for interfacing with another network that uses different protocols. In another embodiment, router 304 may be a router, which is a specialized network device that determines the next network point to which to forward a data packet toward its destination. In another embodiment, router 304 may be a bridge, which is a device that connects multiple network segments along the data link layer. In another embodiment, router 304 may be a switch, which is a device that allocates traffic from one network segment to certain lines (intended destination(s)) which connect the segment to another network segment. In another embodiment, router 304 may be a hub, which connects multiple Ethernet segments together making them act as a single segment. In another embodiment, router 304 may be a repeater, which is a device to amplify or regenerate digital signals received while sending them from one part of a network into another.

In another embodiment, router 304 may be a hybrid network device. For example, in one embodiment, router 304 may be a multilayer Switch, which is a switch which, in addition to switching on OSI layer 2, provides functionality at higher protocol layers. In another embodiment, router 304 may be a protocol Converter, which is a hardware device that converts between two different types of transmissions, such as asynchronous and synchronous transmissions. In another embodiment, router 304 may be a bridge router (Brouter), which combines router and bridge functionality and works on OSI layers 2 and 3. In another embodiment, router 304 may be a digital media receiver, which connects a computer network to a device, such as a home theatre system, in a local environment.

In another embodiment, router 304 may be a combination of hardware or software components that typically operate on the connection point of different networks, such as between an internal network and an external network. For example, in one embodiment, router 304 may be a proxy, which is a computer network service that allows clients to make indirect network connections to other network services. In another embodiment, router 304 may be a firewall, which is generally a piece of hardware or software put on the network to prevent some communications forbidden by the network policy. In another embodiment, router 304 may be a Network Address Translator, which is a network service implemented as hardware or software that converts internal network addresses to external network addresses and vice versa.

Router 304 may also be other hardware, software, or a combination thereof, for establishing networks or dial-up connections. In one embodiment, router 304 may be a multiplexer, which is a device that combines several electrical signals into a single signal. In another embodiment, router 304 may be a network adapter, which is a piece of computer hardware to allow the attached computer to communicate over a data network. In another embodiment, router 304 may be a modem, which is a device that modulates an analog "carrier" signal (such as sound), to encode digital information, and that also demodulates such a carrier signal to decode the transmitted information, to facilitate a computer in communicating with another computer over a telephony network. In another embodiment, router 304 may be an ISDN terminal adapter (TA), which is a specialized gateway for ISDN. In another embodiment, router 304 may be a line driver, which is a device to increase transmission distance by amplifying the signal. The above examples of router 304 are not intended to be limiting on the illustrative embodiments. For example, an implementation of router 304 may use another device for a similar purpose, or combine two or more of the above described example devices within the scope of the invention.

Home area network 306 may be a data processing environment setup in an example local environment of a home or an office space. A set of sensors and interface components for various appliances may operate within communicate with a home gateway. For example, light sensor 308, motion sensor 310, infrared sensor 312, one or more other sensor 314, and one or more appliance interface 316 may be included in the set of sensors and appliance interfaces in home area network 306. Sensors 308-314 and appliance interfaces 316 may report status to and receive commands from home gateway 318.

Router 304 may communicate with home gateway 318 and provide data connectivity between home gateway 318 and network 320. An example of home gateway may be a gateway device implementing ZigBee® communication standard (ZigBee is a registered trademark of ZigBee Alliance in the United States).

As the invention recognizes, FIG. 3 shows a variety of commonly used sensors and appliance interface components in presently used home automation and building management solutions. Additionally, a home gateway, such as home gateway 318 is necessary for the present solutions. Home gateway 318 is also implemented in some form in the present solutions in addition to the networking components that provide wide area network (WAN) connectivity.

Furthermore, the methodology of operating home area networks similar to home area network 306 depends on tight relationship between home gateway 318 and the set of sensors and appliance interfaces. Home gateway 318 operates the various devices coupled to the set of sensors and appliance interfaces by using a predetermined program.

For example, home gateway 318 may send a "Turn-on" command a preset time to an appliance interface associated with a television set. The turning on of the television in this manner is not based on an inference of a viewer's presence from other factors. If home gateway 318 is programmed to turn the television on at a set time, home gateway 318 turns on the television at that time, regardless of the viewer being present to watch the television. Other devices are operated in existing home automation solutions in a similar manner.

Figure 4:
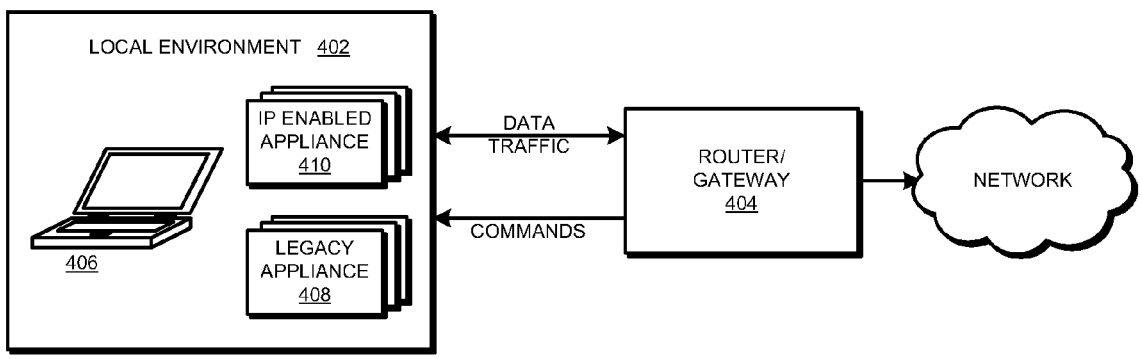
FIG. 4 depicts a block diagram of a local environment configuration in accordance with an illustrative embodiment.

With reference to FIG. 4, this figure depicts a block diagram of a local environment configuration in accordance with an illustrative embodiment. Local environment 402 may be similar to local environment 302 in FIG. 3. Router 404 may be implemented using router 304 in FIG. 3.

Local environment 402 may include a set of devices that may have to be controlled, operated, or otherwise manipulated to conserve energy. Computer 406 is an example of such a device.

Many appliances may also be present in the set of devices in local environment 402. Legacy appliances 408 may be appliances that presently do not communicate over internet protocol (IP) networks. An appliance in legacy appliances 408 may need an appliance interface for controlling the appliance.

IP enabled appliances 410 may be appliances that are capable of communicating over an IP network. An appliance in IP enabled appliances 410 may communicate with other data processing systems, IP enabled devices, and data networks over a TCP/IP network. IP enabled appliances 410 may report their status and be controllable by commands transmitted over a TCP/IP data network.

In the example configuration depicted in this figure, router 404 may be modified in accordance with an illustrative embodiment to monitor data traffic to and from local environment 402. Router 404 may be further modified to send commands to one or more devices in local environment 402 to effect a change in the device's status. For example, a television may be an IP enabled appliance in IP enabled appliances 410. Router 404 may be able to monitor data traffic to and from the television set as a part of the overall data traffic monitoring process according to an embodiment of the invention. Router 404 may be able to send a set of commands to the television set to, for example, power on or off, change channels, or to change brightness or sound settings in accordance with an illustrative embodiment.

Figure 5:
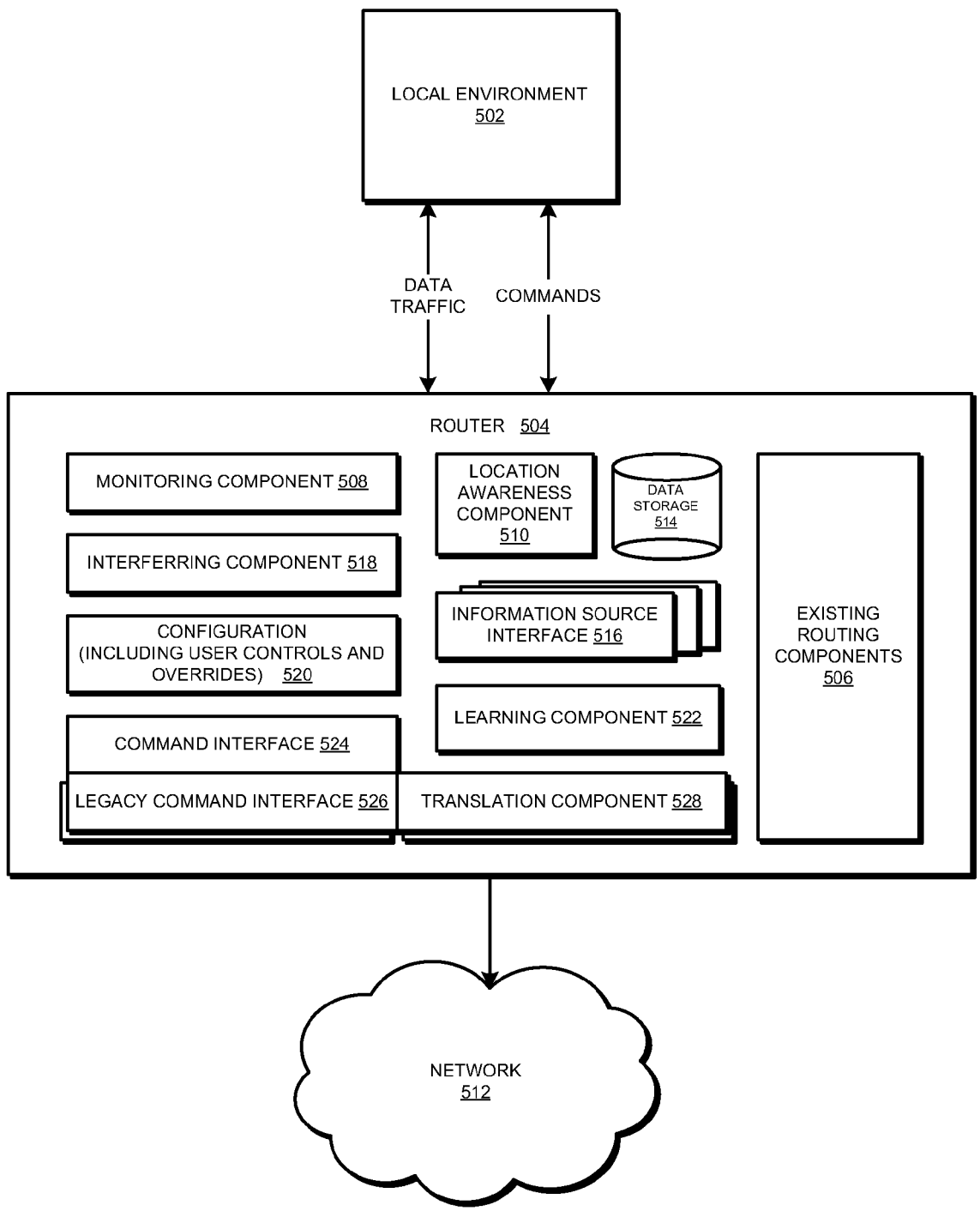
FIG. 5 depicts a block diagram of components in a router in accordance with an illustrative embodiment.

With reference to FIG. 5, this figure depicts a block diagram of components in a router in accordance with an illustrative embodiment. Local environment 502 may be similar to local environment 402 in FIG. 4.

Router 504 may be implemented using, for example, router 404 in FIG. 4. Router 504 has been depicted as being a network router device only as an example and this nature of the depicted device is not limiting on the invention. Router 504 may be a network router, a switch, a bridge, a modem, or any other data communication device configurable and usable in the manner of the illustrative embodiment, within the scope of the invention.

Router 504, in addition to existing routing components 506 includes several other components in accordance with the illustrative embodiment. For example, monitoring component 508 monitors the data traffic to and from local environment 502.

Location awareness component 510 determines the location of router 504 with respect to other devices in network 512. For example, location awareness component 510 may allow router 504 to determine that router 504 is located one hundred yards from a wireless data network access point.

Location awareness component 510 may also determine, for example, that router 504 is located on the third floor of the building, and it takes a user approximately six minutes to park the car and ride the elevator from the lobby to the third floor.

Generally, location awareness component 510 may generate, develop, or otherwise create a map or map-like location data to locate router 504 in the geographical topology of a certain area, in the data network, in the local environment, or a combination thereof. Furthermore, location awareness component 510 may store such map or map-like location data in data storage 514.

Data storage 514 may be any type of data storage suitable for a given implementation. For example, in one embodiment, data storage 514 may be flash memory within router 504. In another embodiment, data storage 514 may be a hard disk accessible to router 504 over network 512. In another embodiment, data storage 514 may be a removable data storage medium, such as a compact disc or a flash drive.

Router 504 may optionally include one or more information source interface 516. For example, one information source interface 516 may be an interface to a calendaring system. Another example information source interface 516 may be to a project planning system. Another example information source interface 516 may be to a social networking website.

In operation, information source interface 516 may communicate with a compatible information source and receive information about events, plans, or schedules that may assist router 504 in determining a desirable state of certain devices in local environment 502. For example, in one embodiment, one information source interface 516 may be an interface to a user's calendaring application. Using this interface, router 504 may learn that the user is planning to be away for a conference Monday through Wednesday of next week.

Router 504 may use this information or inferences from this information to adjust a state of operation of one or more devices in local environment 502. For example, router 504 may allow a rise in the temperature of local environment 502 by shutting off or sparingly operating the air conditioning appliance therein for the duration that the user is going to be away.

As another example, in another embodiment, one information source interface 516 may be an interface to a social networking website account. Using the information a user may have posted to that account, router 504 may determine that several persons are expected to gather at local environment 502 at a set date and time. Using this information, router 504 may adjust the lighting, air conditioning, television settings, sound system settings, and availability of power at certain terminals in local environment 502.

The examples of information source interface 516 are selected and described only for the clarity of the operation of illustrative embodiment. These example interfaces are not intended to be limiting on the invention. Many other information source interfaces 516 to other types of information sources will be conceivable from this disclosure and the same are contemplated within the scope of the invention.

Inferring component 518 may be a component that draws inferences from available information. For example, in one embodiment, inferring component 518 may draw an inference using a combination of a pattern in the data traffic, information acquired from any number of information sources, information in data storage 514, and configuration 520.

An inference is a logical conclusion that can be drawn given certain information. For example, from the information that a user is going to be at a meeting at one place at a given time, an inference can be drawn that the user is not going to be at another place at the given time. As another example, information may be available to router 504 that informs that a device has connected to a first access point at one time, to a second closer access point some time later, and to a third access point, which is closer than the second access point some time thereafter. From this information, an inference can be drawn that the device, and possibly a user associated with the device, is travelling towards router 504.

These examples of inferences are not intended to be limiting on the invention. Inferences being logical conclusions drawn based on available information, the scope of the inferences within the scope of the invention depends on the nature of the information available, and the nature of conclusions desired from that information.

Furthermore, in one embodiment, inferring component 518 may include a set of rules. A set of rules is one or more rules. A rule may be code, instructions, data structure, or values, configured in a manner that when executed and provided with certain information, the rule outputs an inference. A rules engine may be configured to operate in conjunction with inference component 518 to execute the rules.

Configuration 520 may include instructions, commands, controls, values, conditions, or other specifications that may assist router 504 or a component therein to operate in accordance with an illustrative embodiment. For example, in one embodiment, configuration 520 may allow router 504 to be configured similar to home gateway 318 in FIG. 3, and take over the home gateway's functions.

In another embodiment, configuration 520 may allow a user to store instructions to override certain inferences. For example, even though a user's calendaring application may show that the user is to be away for a meeting at a set date and time, the user may decide not to attend the meeting. If the user has not updated the user's calendar to reflect this change, the user may override an inference that may lead router 504 to a shutdown the user's printer device in local environment 502.

In another embodiment, configuration 520 may include instructions for handling certain devices in specific manner. For example, a projector device may include a Xenon lamp that has to warm up to a certain temperature over a period to attain a desired luminescence. Configuration 520 may include an instruction for a preset lead-time for powering on the projector device. Thus, router 504 may add the lead-time to a determined time of powering on the projector so that the projector's lamp is at the desired luminescence at the determined time.

The example configurations described in this disclosure are not limiting on the invention. Any configuration, control, or override can be similarly configured within the scope of the invention.

Learning component 522 may be a component that learns the inferences drawn from historic patterns in data traffic and other information. For example, in one embodiment, learning component 522 may learn and store in data storage 514 that a user takes sixteen minutes to walk from one end of the campus to local environment 502. As an example, learning component 522 may learn this information by tracking historical information about a device associated with the user and the device's connections to various access points while travelling across campus.

For example, the device may be the user's laptop computer. While traveling from one end of the campus to local environment 502, the laptop's wireless network adapter may connect with three different access points located along the way. Router 504 may receive information about the wireless network adapter connecting to each access point as the connections occur. Learning component 522 may be configured to accumulate the time intervals between receipts of such information.

Learning component 522 may perform these calculations over a period, during one or more travels of the user. Accordingly, learning component 522 may determine the average travel time from that end of the campus to local environment 502.

Learning component 522 may also keep track of inferences drawn from historic data patterns. For example, in one instance, when the outbound data traffic from local environment 502 includes a certain amount, type, instance, or specific information, the correct inference may be that a computer in local environment 502 may be executing a pre-programmed task without the user's input.

In another instance, presence of certain information in the data traffic, such as a credit card number, the correct inference may be that the user is present in the local environment and inputting that information. In another instance, using the combination of the two patterns in the data traffic, another correct inference may be that the computer has to be kept powered up, whereas the printer, the air conditioner, the lighting fixture can be turned off in one case but not the other.

In another instance, the pattern of data traffic may show a total absence of data traffic to or from local environment 502. Accordingly, learning component 522 may learn from inferring component 518 that the correct inference is that the user has left the local environment with the data communication devices and certain other devices can be reconfigured to conserve energy.

Generally, learning component 522 may learn any type of information or relationship between information. Some examples of the operations of learning component 522 may be to learn already drawn inferences from inferring component 518, compute derivative information from available information, learn relationships between information sources, learn topological information about a geographical area, and learn topological information about a data network. Additionally, learning component 522 may store the learnt or computed information, such as in data storage 514.

Command interface 524 may create and communicate commands from router 504 to a device in local environment 502. In one embodiment, command interface 524 may create the commands for, and communicate the commands over a TCP/IP network.

Legacy command interface 526 may create and communicate commands from router 504 to a device in local environment 502. In one embodiment, for example, legacy command interface 526 may emulate ZigBee commands for ZigBee enabled devices in local environment 502. Router 504 may implement any number of legacy command interfaces according to legacy command interface 526 to emulate control commands for any number of existing home automation standards.

Translation component 528 may translate a command created by command interface 524 to a suitable legacy command for legacy command interface 526. Router 504 may implement any number of translation components according to translation component 528 to translate control commands for any number of existing home automation standards.

Figure 6:
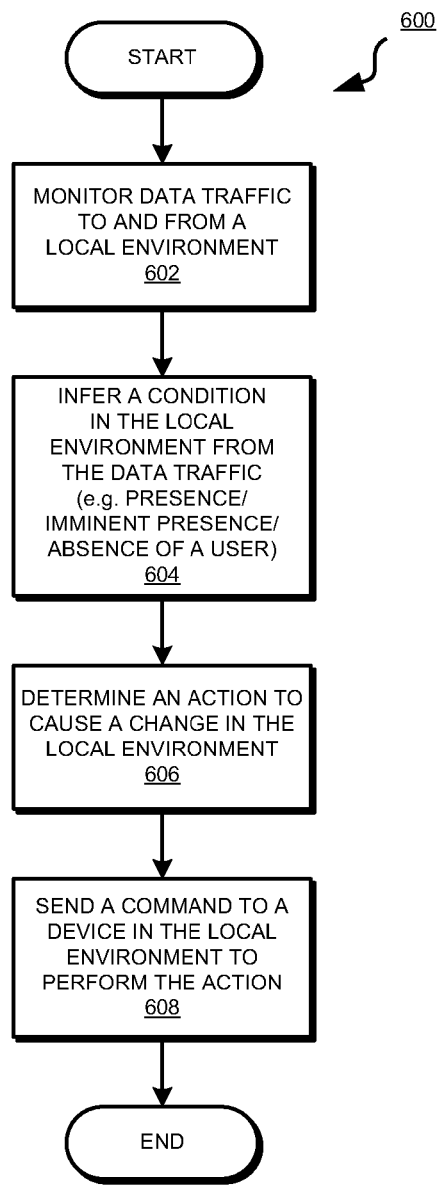
FIG. 6 depicts a flowchart of a process of managing a local environment using data traffic information in accordance with an illustrative embodiment.

With reference to FIG. 6, this figure depicts a flowchart of a process of managing a local environment using data traffic information in accordance with an illustrative embodiment. Process 600 may be implemented in a data networking device, such as for example, in router 504 in FIG. 5.

Process 600 begins by monitoring data traffic to a local environment, from a local environment, or a combination thereof (step 602). Process 600 infers a condition that may exist in the local environment from the data traffic, a pattern of data in the data traffic, or a combination thereof (step 604). For example, a condition in the local environment may be the absence of a user in the local environment. Another condition in the local environment may be the presence of a user in the local environment. Another condition in the local environment may be the imminent presence of a user in the local environment.

Process 600 determines an action to cause a change in the local environment (step 606). For example, if the condition is the absence of the user, an action selected in step 606 may be to reduce the air conditioning in the local environment.

Process 600 sends a command to a device in the local environment to perform the action (step 608). Process 600 ends thereafter. For example, if the action is to reduce the air conditioning in the local environment, the command may be a power-off command to an air conditioner device or a power supply unit associated there with in the local environment.

Figure 7:
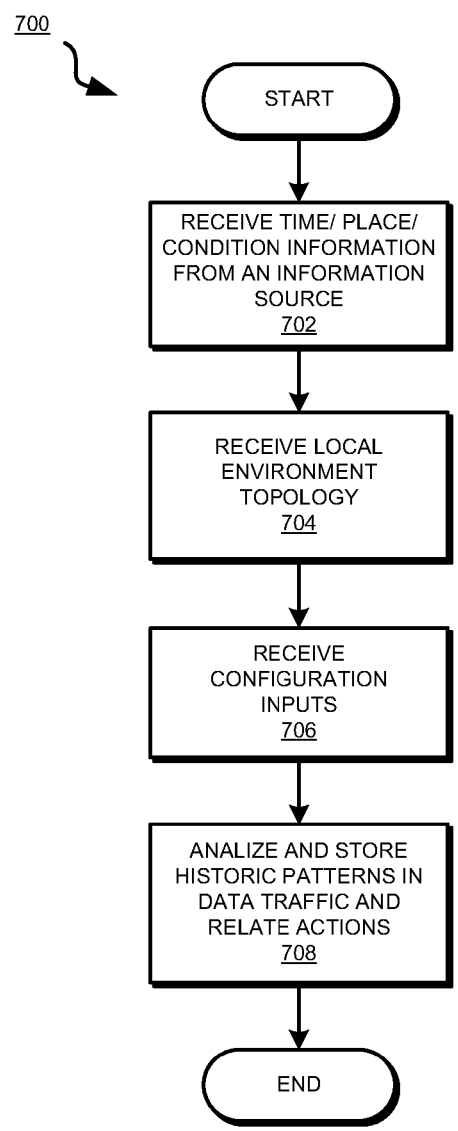
FIG. 7 depicts a flowchart of a process of learning in accordance with an illustrative embodiment.

With reference to FIG. 7, this figure depicts a flowchart of a process of learning in accordance with an illustrative embodiment. Process 700 may be implemented in a networking device, such as for example, router 504 in FIG. 5.

Process 700 begins by receiving information about a combination of time, place, and condition of events from an information source (step 702). For example, process 700 may receive a meeting schedule from a calendaring application, informing about time, place, and attendees of a meeting. Process 700 receives local environment topology (step 704). In step 704, process 700 may receive geographical topology of the local environment and areas surrounding the local environment. For example, process 700 may receive map or data describing building layout, space plan, plat, global positioning coordinates of physical objects, or a combination thereof pertaining to a geographical area.

In step 704, process 700 may also receive data network topology of the local environment, data network topology of adjacent or connected networks, and data network topologies of other networks that may act as information sources. For example, process 700 may receive descriptions of devices in a LAN, WAN, or HAN. Process 700 may also receive geographical placement information about such devices. Process 700 may receive similar information from other networks, such as a cellular phone service provider's cell and base station layouts, or a wireless broadband provider's access point locations.

Process 700 additionally receives configuration inputs (step 706). Process 700 may receive configuration information and inputs from users, applications, information sources, devices in the local environment, devices elsewhere in a data network, or a combination thereof.

Furthermore, process 700 may also create configuration information based on previous inferences and learning process. For example, as described with respect to an example projector device in this disclosure, process 700 may learn by monitoring the data traffic to or from the projector how long the projector takes from power-on to beginning display. Process 700 may use this learnt information to create a lead-time configuration for the projector device.

Process 700 may also analyze and store historic patterns in data traffic together with actions associated with such patterns (step 708). Process 700 ends thereafter.

For example, process 700 may learn that historically, the data traffic in either direction drops below a threshold volume after six PM. Process 700 may also learn that upon the detection of such a pattern—the dropped volume of data traffic, certain devices in the local environment are powered down or configured to operate with reduced power. Process 700 may store the learning about such patterns and related actions for use with future occurrence of similar data traffic patterns.

Process 700 is described as receiving certain types of information and learning from those types of information only as an example. Accordingly, the example steps of process 700 are not intended to be limiting on the invention. An implementation of process 700 may include other information gathering steps, and other learning steps related to specific types of information gathered within the scope of the invention.

Figure 8:
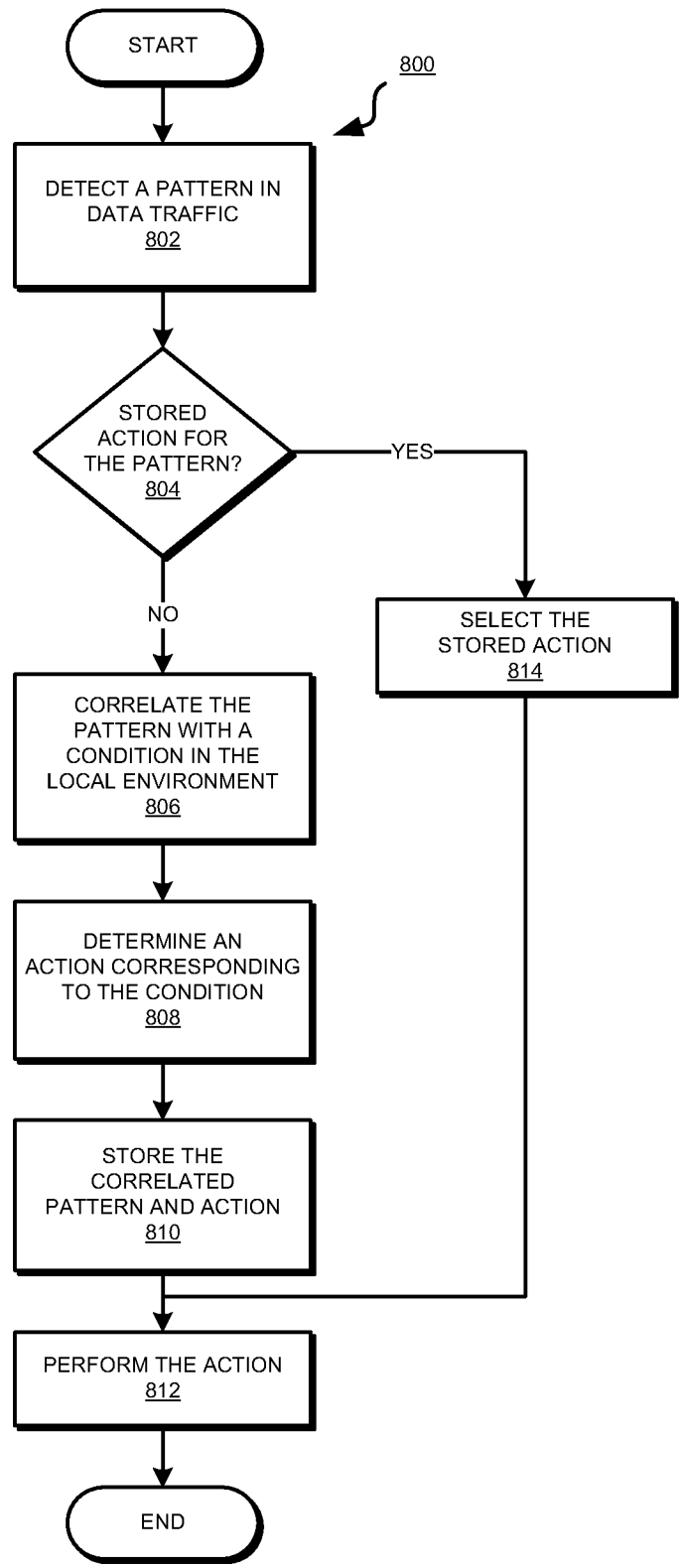
FIG. 8 depicts a flowchart of a process of inferring conditions in a local environment using data traffic information in accordance with an illustrative embodiment.

With reference to FIG. 8, this figure depicts a flowchart of a process of inferring conditions in a local environment using data traffic information in accordance with an illustrative embodiment. Process 800 may be implemented in a networking device, such as for example, router 504 in FIG. 5.

Process 800 begins by detecting a pattern in a given data traffic (step 802). Process 800 determines whether an action corresponding to the pattern was previously saved or stored in a data storage (step 804).

If no stored action is found that corresponds to the pattern detected in step 802 ("No" path of step 804), process 800 correlates the pattern with a condition in the local environment (step 806). For example, a drop in the data traffic below a threshold may be a pattern in the data traffic, and absence of user as the cause of pattern may be a condition in the local environment.

Process 800 determines an action corresponding to the condition (step 808). Continuing with the above example for clarity, if absence of a user is a condition in the local environment, powering down or reducing power consumption in a device in the local environment may be an action.

Process 800 stores the correlated pattern and action in a data storage for future reuse (step 810). Process 800 performs the action of step 808 (step 812). Process 800 ends thereafter.

Returning to step 804, if an action was stored ("Yes" path of step 804), process 800 selects the stored action (step 814). Process 800 performs the action of step 808 (step 812). Process 800 ends thereafter.

Figure 9:
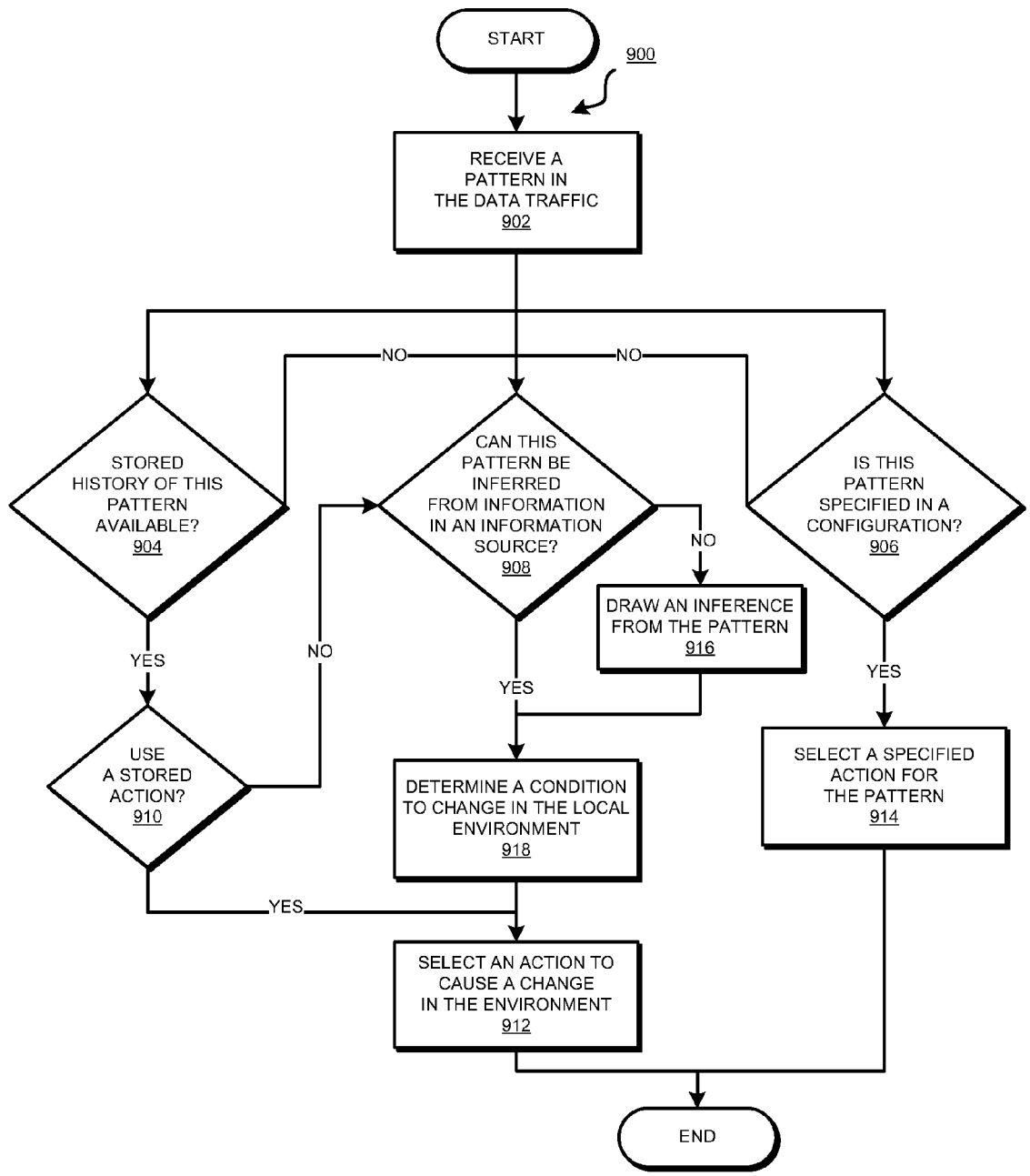
FIG. 9 depicts a process of controlling a local environment using data traffic information in accordance with an illustrative embodiment.

With reference to FIG. 9, this figure depicts a process of controlling a local environment using data traffic information in accordance with an illustrative embodiment. Process 900 may be implemented in a networking device, such as for example, router 504 in FIG. 5.

Process 900 begins by receiving a pattern in a given data traffic (step 902). Process 900 may execute steps 904, 906, 908, or a combination thereof in any order.

Process 900 determines whether a stored history of the patterns of step 902 is available (step 904). Process 900 may also determine whether the pattern of step 902 is specified in the configuration (step 906). For example, a configuration file may specify an action to take when a certain pattern in the data traffic is encountered.

Process 900 may also determine whether the pattern of step 902 can be inferred from information received from an information source (step 908). In other words, process 900 may determine in step 908 whether the pattern can be logically caused by an event whose information is provided by an information source. As an example, a drop in data traffic below a threshold may be a pattern received in step 902. If that pattern occurs in the middle of a work day, process 900 may look to information received from a calendaring application to determine whether the user is absent for an event in the calendaring information.

Returning to step 904, if process 900 determines that a stored history is available ("Yes" path of step 904) process 900 determines whether the stored action associated with the stored pattern is to be used (step 910). If the stored action can be used ("Yes" path of step 910), process 900 selects that action to cause a change in the local environment (step 912). Process 900 ends thereafter.

If process 900 determines that the stored action cannot or should not be used ("No" path of step 910), process 900 proceeds to step 908. Process 900 then makes the determination of step 908.

If process 900 determines that the pattern of step 902 is not specified in a configuration ("No" path of step 906), process 900 proceeds to step 908 as well. If, however, process 900 determines that the pattern and a corresponding action is specified in the configuration ("Yes" path of step 906), process 900 selects the specified action corresponding to the pattern (step 914). Process 900 ends thereafter.

Returning to step 908, if process 900 determines that the pattern cannot be inferred from information from an information source ("No" path of step 908), process 900 draws an inference from the pattern, such as by applying a rule (step 916). Process 900 determines a condition in the local environment based on the inference of step 916 (step 918). If process 900 determines that the pattern can be inferred from information from an information source ("Yes" path of step 908), process 900 proceeds to step 918 based on that inference.

Based on the determined condition in step 918, process 900 proceeds to step 912 and selects an action to cause a change in the local environment according to step 912. Process 900 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, an apparatus, and computer program product are provided in the illustrative embodiments for managing a local environment using data traffic information. By implementing an embodiment of the invention, a local environment may be managed using data traffic information in a networking device.

Furthermore, by implementing an embodiment of the invention, presently used sensors and transducers may be eliminated or reduced in numbers in a local environment. An embodiment of the invention may also allow elimination of a home gateway device. By reducing or eliminating the sensors, transducers, and home gateway, the invention offers an improvement in energy efficiency of managing local environments, and a reduction in infrastructure costs. The invention may also reduce the operating cost of a local environment by reducing the components of presently used home automation systems. For example, one or more processes according to an embodiment of the invention may be configured to execute as daemon processes or background processes in an existing router.

Additionally, the invention leverages already existing data traffic to infer conditions in the local environment. The invention incorporates other existing information in the inferring process. Thus, the invention may improve the energy efficiency and reduce the complexity by only insignificantly affecting the data traffic in a local environment.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer usable program product comprising a computer usable storage device including computer usable code for managing a local environment using data traffic information stored in a computer memory, the computer usable code comprising:
   computer usable code for monitoring at a networking device, a data traffic on a data network associated with the local environment, the local environment comprising a set of devices, a device in the set of devices being controllable using the data network;
   computer usable code for computing, at the networking device, a first logical conclusion from a first pattern in the data traffic, the first pattern being a type of data that is generated while a user is present in the local environment and interacting with a system, the first logical conclusion being usable for selecting a first device from the set of devices, wherein the first logical conclusion is distinct from a second logical conclusion computed at the networking device from a second pattern in the data traffic, the second pattern being a pattern in historical data indicative of a pre-programmed task executing on the system without the user interacting with the system, and wherein the second logical conclusion is usable for selecting a second device from the set of devices;
   computer usable code for concluding, using the first logical conclusion and the second logical conclusion, that the user is present in the local environment;
   computer usable code for determining an action to cause a change in the local environment using the first device;
   computer usable code for determining a topology of the local environment;
   computer usable code for using the topology to compute distances between a subset of devices;
   computer usable code for determining the user's location relative to the subset of devices using the topology;
   computer usable code for estimating, based on the user's location, a time period before the action; and
   computer usable code for sending a command corresponding to the action to a first device in the local environment such that the action is performed after the time period.

2. The computer usable program product of claim 1, further comprising:

computer usable code for receiving information from a set of information sources; and computer usable code for using the data traffic and the information from the set of information sources in the computing.

3. The computer usable program product of claim 2, wherein the local environment topology includes geographical map of the local environment.

4. The computer usable program product of claim 2, further comprising:

computer usable code for determining whether the first pattern is detected from information received from an information source in the set of information sources, forming an information detection determination; and computer usable code for determining, using a rule, responsive to the information detection determination being false, that a condition exists in the local environment, wherein the condition is used in computing the first logical conclusion from the first pattern.

5. The computer usable program product of claim 1, further comprising:

computer usable code for detecting the first pattern in the data traffic;

computer usable code for determining whether the first pattern is specified in a configuration, forming configuration determination; and computer usable code for selecting, responsive to the configuration determination being true, a configured action corresponding to the first pattern and specified in the configuration as the action.

6. The computer usable program product of claim 1, further comprising:

computer usable code for detecting the first pattern in the data traffic, further comprising:

computer usable code for correlating the first pattern with a condition in the local environment; and computer usable code for storing the first pattern and the action in a data storage.

7. The computer usable program product of claim 1, further comprising:

computer usable code for detecting the first pattern in the data traffic, further comprising:

computer usable code for determining whether the first pattern and a stored action correlated to the first pattern are stored in a data storage; and computer usable code for performing, responsive to the stored action being in the data storage, the stored action as the action.

8. The computer program product of claim 1, wherein the computer usable code is stored in a computer readable storage medium in a data processing system, and wherein the computer usable code is transferred over a network from a remote data processing system.

9. The computer program product of claim 1, wherein the computer usable code is stored in a computer readable storage medium in a server data processing system, and wherein the computer usable code is downloaded over a network to a remote data processing system for use in a computer readable storage medium associated with the remote data processing system.

10. The computer usable program product of claim 1, further comprising:

computer usable code for detecting, that the first pattern and the second pattern are both present in the data traffic;

computer usable code for correlating the first pattern with the second pattern using a second rule, to determine that a second condition exists in the local environment;

computer usable code for computing a third logical conclusion using the second condition;

computer usable code for determining a second action to cause a second change in the local environment according to the third logical conclusion and using a third device; and computer usable code for sending a command corresponding to the second action to the third device in the local environment to perform the second action.

11. A data processing system for managing a local environment using data traffic information stored in a computer memory, the data processing system comprising:

a storage device including a storage medium, wherein the storage device stores computer usable program code; and a processor, wherein the processor executes the computer usable program code, and wherein the computer usable program code comprises:

computer usable code for monitoring at a networking device, a data traffic on a data network associated with the local environment, the local environment comprising a set of devices, a device in the set of devices being controllable using the data network;

computer usable code for computing, at the networking device, a first logical conclusion from a first pattern in the data traffic, the first pattern being a type of data that is generated while a user is present in the local environment and interacting with a system, the first logical conclusion being usable for selecting a first device from the set of devices, wherein the first logical conclusion is distinct from a second logical conclusion computed at the networking device from a second pattern in the data traffic, the second pattern being a pattern in historical data indicative of a pre-programmed task executing on the system without the user interacting with the system, and wherein the second logical conclusion is usable for selecting a second device from the set of devices;

computer usable code for concluding, using the first logical conclusion and the second logical conclusion, that the user is present in the local environment;

computer usable code for determining an action to cause a change in the local environment using the first device;

computer usable code for determining a topology of the local environment;

computer usable code for using the topology to compute distances between a subset of devices;

computer usable code for determining the user's location relative to the subset of devices using the topology;

computer usable code for estimating, based on the user's location, a time period before the action; and computer usable code for sending a command corresponding to the action to a first device in the local environment such that the action is performed after the time period.

12. The data processing system of claim 11, further comprising:

computer usable code for receiving information from a set of information sources; and computer usable code for using the data traffic and the information from the set of information sources in the computing.

13. The data processing system of claim 12, further comprising:

computer usable code for determining whether the first pattern is detected from information received from an information source in the set of information sources, forming an information detection determination; and computer usable code for determining, using a rule, responsive to the information detection determination being false, that a condition exists in the local environment, wherein the condition is used in computing the first logical conclusion from the first pattern.

14. The data processing system of claim 11, further comprising:

computer usable code for detecting the first pattern in the data traffic;

computer usable code for determining whether the first pattern is specified in a configuration, forming configuration determination; and computer usable code for selecting, responsive to the configuration determination being true, a configured action corresponding to the first pattern and specified in the configuration as the action.

15. The data processing system of claim 11, further comprising:

computer usable code for detecting, that the first pattern and the second pattern are both present in the data traffic;

computer usable code for correlating the first pattern with the second pattern using a second rule, to determine that a second condition exists in the local environment;

computer usable code for computing a third logical conclusion using the second condition;

computer usable code for determining a second action to cause a second change in the local environment according to the third logical conclusion and using a third device; and computer usable code for sending a command corresponding to the second action to the third device in the local environment to perform the second action.

* * * * *